United States Patent [19]

Weiss

[11] 4,379,216
[45] Apr. 5, 1983

[54] METHOD AND APPARATUS FOR SOLDER BONDING MULTILAYER TUBING

[76] Inventor: Hans J. Weiss, Nassauische Str. 21, 5912 Hilchenbach, Fed. Rep. of Germany

[21] Appl. No.: 247,854

[22] Filed: Mar. 26, 1981

[30] Foreign Application Priority Data

Mar. 28, 1980 [DE] Fed. Rep. of Germany ....... 3012086

[51] Int. Cl.³ .............................................. B23K 1/14
[52] U.S. Cl. ......................... 219/85 CM; 219/85 CA
[58] Field of Search ............. 219/85 CA, 85 CM, 110

[56] References Cited

U.S. PATENT DOCUMENTS

| | | | |
|---|---|---|---|
| 403,707 | 5/1889 | Thomson | 219/85 CM |
| 2,216,519 | 10/1940 | Quarnstrom | 219/85 CA |
| 2,237,309 | 4/1941 | McMinn | 219/85 CA |
| 2,380,107 | 7/1945 | Hobrock | 219/85 CA |
| 2,681,403 | 6/1954 | Twivey | 219/85 CM |
| 2,696,546 | 12/1954 | Dublier | 219/85 CA |

*Primary Examiner*—Elliot A. Goldberg
*Attorney, Agent, or Firm*—Karl F. Ross; Herbert Dubno

[57] ABSTRACT

Tubing is made by continuously pulling steel strip at a predetermined feed speed from a supply, shaping the strip into a multilayer tube of a predetermined mass per unit length, and advancing the tube at the feed speed through a soldering station. The strip is coated with a solder-type material and an electric current is passed through the tube between a contact engaging the tube in the station and a contact engaging the tube downstream of the station to fuse the solder and tube together. The contact outside the soldering station is displaced so that the spacing between the contact is varied substantially proportionately with the product of the feed speed and the predetermined mass per unit of length of the tube. Downstream of the soldering station the tube and solder are cooled to bond the tube together.

9 Claims, 3 Drawing Figures

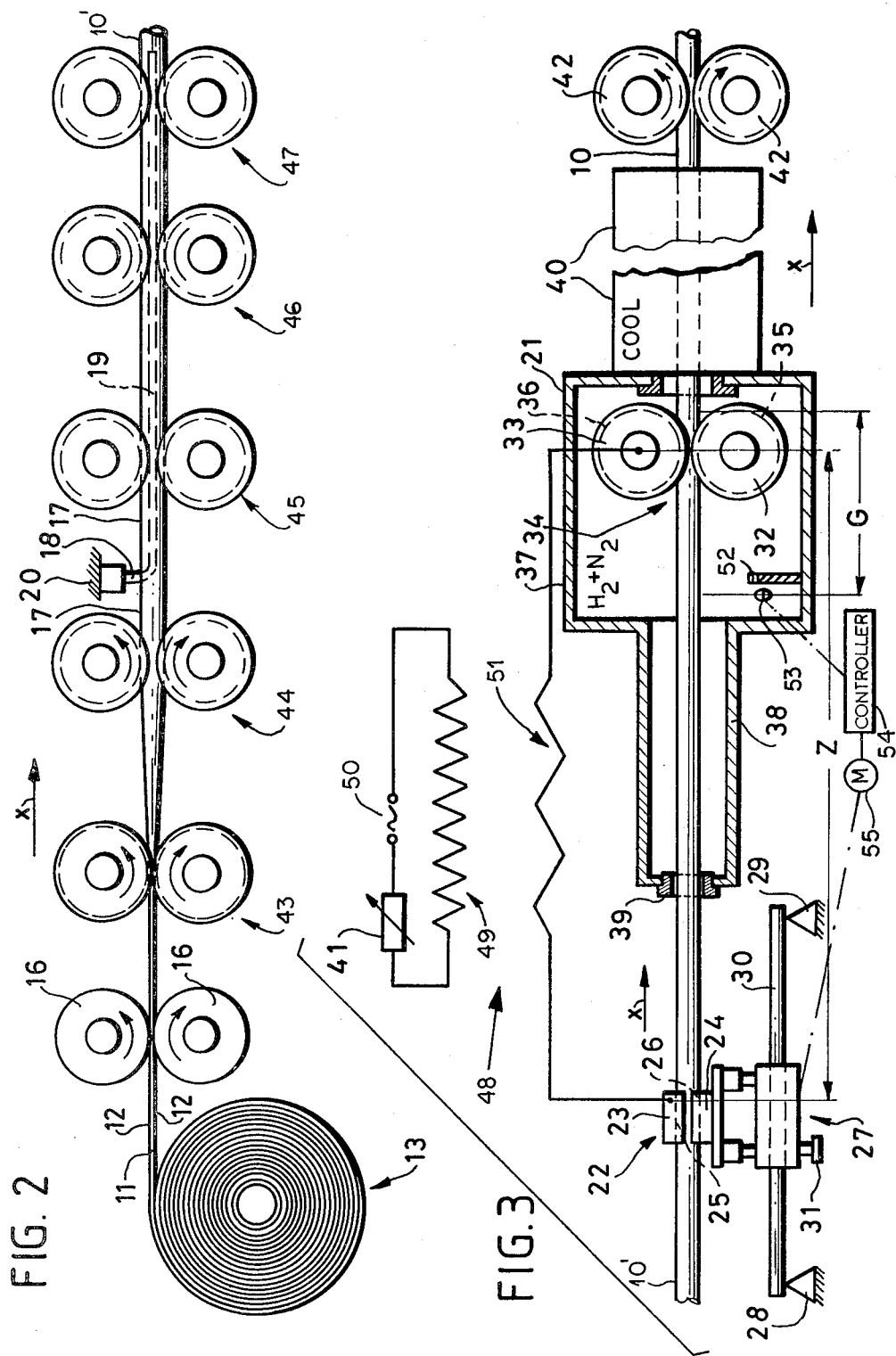

METHOD AND APPARATUS FOR SOLDER BONDING MULTILAYER TUBING

FIELD OF THE INVENTION

The present invention relates to multilayer tubing. More particularly this invention concerns a method of and an apparatus for making such tubing.

BACKGROUND OF THE INVENTION

It is known from German Pat. No. 813,839 issued Sept. 17, 1951 to R. H. Hobrock to continuously manufacture steel tubing by pulling a solder-clad steel strip off a supply continuously, shaping it into a multilayer tube, and fusing the solder to hold the tube together. This fusing can either be done by inductively heating the multilayer tube to generate eddy currents therein, or by passing an electric voltage through the tube so as to heat and fuse the solder. This method is intended to produce a relatively seamless tubing of considerable strength. What is more, the method works at relatively low cost and can operate continuously.

The principal difficulty with this method is it is almost impossible to ensure uniform quality of the tubing being produced. Frequently the solder is insufficiently fused so that a cold-solder joint is produced, or at other times the solder is melted at such a high temperature that it diffuses into the metal it is supposed to be bonding to or runs off altogether, forming no connection at all.

Even in a wholly magnetic method, such as described in German published patent application No. 2,828,960 filed June 28, 1978 by H. U. Dietzel and W. Muffke, it has normally been found impossible to achieve uniform results with respect to the solder layer between adjacent layers of the tube.

Accordingly recourse has been had to a method of the type described in German published application 2,839,684 filed Sept. 8, 1978 by H. Abel, W. Muffke, and H. U. Dietzel. In accordance with this method sections of the multilayer tubes are cut as they are produced continuously and then are treated in a batch-type operation in a heating chamber so that uniform heating can be guaranteed, along with a good solder joint.

As the result of the complexity of achieving uniformly good results with the known methods, the production of multilayer tubing in accordance with the above-described procedures has been very small. Normally unreliable quality of such tubing has led to little or no use of the patented method.

OBJECTS OF THE INVENTION

It is therefore an object of the present invention to provide an improved multilayer tube as well as a method of and an apparatus for making it.

Another object is to provide a multilayer tube of uniform quality, as well as a method of and an apparatus for producing such tubing of uniform quality.

SUMMARY OF THE INVENTION

These objects are attained according to the instant invention in a method of the above-described general type, that is where steel strip is continuously pulled at a predetermined feed speed from its supply, is shaped into a multilayer tube of a predetermined mass per unit of length, and is advanced at the feed speed to a soldering station. According to this invention an electric current is passed through the tube between a contact engaging the tube in the station and a contact engaging the tube adjacent the station to fuse solder fed to the tube in the station together, whereupon the tube and solder are cooled downstream of the station to bond same together. According to the instant invention the spacing between the contacts is varied substantially proportionately with the product of the feed speed and the predetermined mass per unit of length of the tube. If necessary it is also possible to vary the voltage of the electricity fed through the tube to heat it between the contacts.

According to the instant invention the feed speed, mass per unit of length of the tube, and electrical current density are all maintained at a fixed ratio relative to one another so that the heated zone of the tube in the soldering station remains constant. As the mass per unit of length of the tube goes up, so does the spacing between the two contacts to ensure uniform heating, and vice versa.

Contrary to the prior-art methods which all merely suggest a variation of the voltage passed through the tube in order to vary the heating effect, the instant invention varies the length of tube along which the voltages pass. It has been found that the prior-art method using a fixed spacing between the contacts produces hot spots and irregular heating, whereas the system according to the instant invention can be adjusted for always regular heating. This is in part caused by the way the band is rolled both with longitudinal and transverse extension, into the tubular shape to start with.

According to the instant invention the solder is in fact a copper cladding of the steel strip used to form the tubing. This copper cladding can be plated by dipping or galvanically on the steel strip.

According to this invention when the mass per unit of time passing through the soldering station increases substantially not only is the spacing between the contacts increased, but so is the voltage applied between them. Surprisingly it has been found that this increase in voltage does not lead to hot spots and damage of the workpiece, but instead gives an almost perfectly even heating. Without increasing the spacing, such as increase in voltage would surely lead to damage of the workpiece when it goes beyond a predetermined limit.

It is also noted that the instant invention has found it frequently necessary to increase the voltage and the spacing when the strip has been cold worked a great deal. In any event the point is to maintain the hot or glowing zone at the same length regardless of the size or speed of the tubing. So long as the soldering station is inside a closed housing filled with a reducing atmosphere a white glowing along with a greenish shimmer is most desirable for best results. If the hot or glowing zone becomes too long the spacing between the contacts is shortened. The main purpose is to heat the tube uniformly, i.e. to a predetermined temperature for predetermined time, so that uniform soldering results are achieved.

If in accordance with the invention the feed speed is increased, the spacing between the contacts is increased and vice versa. Thus an almost perfectly even heating can be assured no matter what the working condition.

This is achieved according to the instant invention by engaging the multilayer tube in the soldering station with a fixed contact and engaging it upstream of the soldering station with a movable contact. The position of this movable contact is changed in accordance with the method described above. The upstream contact can be well upstream of the heating chamber filled with reducing gas that surrounds the downstream contact. In any event the so-called heated or glowing zone of the tube does lie wholly within this chamber, even though the upstream contact lies well upstream.

DESCRIPTION OF THE DRAWING

FIGS. 2 and 3 are partly schematic side views of the upstream and downstream portions of the apparatus for carrying out the method according to this invention.

SPECIFIC DESCRIPTION

Figure 1:
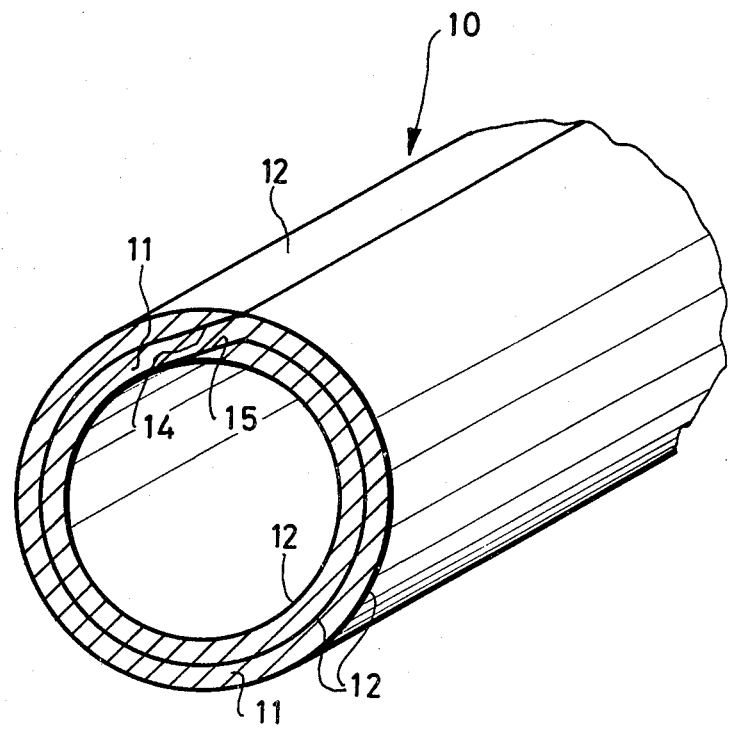
FIG. 1 is a partly sectional and perspective view of a piece of multilayer tubing according to this invention.

As seen in FIG. 1 a tube 10 according to the instant invention is formed of a steel strip 11 having on both sides a copper cladding or coating 12, and having beveled edges 14 and 15 which give the tubing a cylindrical internal and external surface. According to this invention the layers 12 are fused together where they touch one another so that the tubing is integral and extremely strong.

Such tubing is produced according to the instant invention by pulling the clad strip 11, 12 off a supply reel 13 by means of a pair of feed rollers 16, and then passing it through successive sets of rollers 43, 44, 45, 46, and 47. The rollers 43 and 44 advance the strip 11, 12 in the direction x and form it into a U having an upper open side 17. A mandrel 19 has one end 18 secured at 20 to a fixed location and extends downstream inside the strip 11 and 12 through the rollers 45-47 which close up the upper side 17 and in fact fold over the tube so very much that it has substantially the shape shown in FIG. 1, except, of course, that the layers 12 are not fused together.

Thereafter as shown in FIG. 3 the unsoldered tube 10' passes through a downstream contact 22 formed by an upper shoe 23 and a lower shoe 24 respectively engaging the upper and lower surfaces 25 and 26 of the tube 10'. This contacter 22 is carried on a slider 27 displaceable parallel to the direction x on a bar 30 supported on fixed supports 28 and 29. A lock screw 31 can secure this slider 27 and the shoe 22 at any location along the bar 30.

Downstream from the upstream contact 22 the tube 10' enters a heating chamber 21 which is filled with hydrogen or a mixture of hydrogen and nitrogen. This chamber 21 has a small upstream section 38 provided with an inlet collar 39 that snugly fits around the tube 10' and that is formed of polished stainless steel, and a downstream section 37 housing a downstream contact 34 comprised by a pair of rollers 32 and 33 formed with respective U-section peripheral grooves 35 and 36 that snugly engage the tube.

Thereafter the tube passes through a cooling chamber 40 from which it is pull by a pair of downstream output rollers 42.

A transformer 48 has a primary 49 connected through a variable resistor 41 to an alternating-current voltage source 50 and a secondary 51 connected on one side to the downstream contact 34 formed by the rollers 32 and 33 and on the other side to the upstream contact 22 formed by the shoes 23 and 24. The spacing Z between these contacts 22 and 34 is substantially greater than the overall length of the soldering chamber 21. A substantially shorter glowing portion G of the tube 10' is formed by the electricity passing between the contacts 22 and 34. The length Z is adjusted by moving the slider 28 along the bar 30 so that this glowing zone G is of the same length, regardless of the the distance Z between the contacts 22 and 34 and the advance speed V in the transport direction x. In fact the distance Z is directly proportional to the product of the advance speed V and the mass per unit of length of the tubing 10'. Thus as heavier tubing is manufactured the distance Z increases as it does if this advance V is increased, and vice versa.

It is also possible as shown in FIG. 3 to provide inside the downstream portion 37 of the chamber 21 a shield 52 immediately downstream of the upstream end of the glow zone G and a photocell sensor 53 connected via a controller 54 and a servomotor 55 to the slider 27. The controller 54 detects by means of the sensor 53 the downstream edge of the glow zone G. When the light received by the sensor 53 decreases below a predetermined level, indicating the glow zone G is too short, the motor 55 is operated to move the slider 27 and contact 22 downstream. Correspondingly when the detector 53 receives a great deal of light indicating that the glow zone G is too long, the slide contact 22 is moved by the motor 55 upstream, that is away from the chamber 21. Such automatic operation makes it relatively easy to change tubing sizes and have the equipment automatically readjust itself. In addition the system is self regulating so that even when starting up the proper soldering together of the layers of the multilayer tube is incured.

It has been found that the system according to the instant invention produces tubing 10 of almost perfect uniformity.

Of course it is possible also to vary the potential between the contacts 22 and 34 in the manner well known in the art. This variation alone, however, has not been found sufficient to control the heating in the chamber 21 to produce the desired uniformity in the product.

I claim:

1. In a method of making tubing wherein:
   steel strip is continuously pulled at a predetermined feed speed from a supply, is shaped into a multilayer tube of a predetermined mass per unit of length, and said tube is advanced at said speed through a soldering station;
   solder is continuously fed to said tube in said station;
   an electric current is passed through said tube between a contact engaging said tube in said station and a contact engaging said tube adjacent said station to fuse said solder; and
   said tube and solder are cooled downstream of said station to bond same together; the improvement wherein
   the spacing between said contacts is set in dependence on the product of said feed speed and said predetermined mass per unit of length of said tube and is varied substantially proportionately with said product when same varies.

2. The method defined in claim 1 wherein said strip is solder clad, whereby said solder is fed to said station on said tube.

3. In a method of making tubing wherein:
   steel strip is continuously pulled at a predetermined feed speed from a supply, is shaped into a multilayer tube of a predetermined mass per unit of length, and said tube is advanced at said speed through a soldering station;
   solder is continuously fed to said tube in said station;

an electric current is passed through said tube between a contact engaging said tube in said station and a contact engaging said tube adjacent said station to fuse said solder; and said tube and solder are cooled downstream of said station to bond same together; the improvement comprising the steps of setting the spacing between said contacts in dependence on the product of said feed speed and said predetermined mass per unit of length of said tube;

detecting the length of the glow zone created in said station by passing said current through said tube; and varying said spacing to maintain said glow zone of constant length and thereby substantially proportionately varying said spacing with said product when same varies.

4. An apparatus for making tubing, said apparatus comprising:

means for pulling solder-clad steel strip from a supply at a predetermined feed speed, for continuously forming said strip into a multilayer tube of a predetermined mass per unit of length, and for advancing said tube at said speed through a soldering station;

a contact at said station engaging said tube;

another contact engaging said tube adjacent said station;

means for passing an electric current through said tube between said contacts and for thereby heating said tube, fusing said solder, and making a zone of said tube between said contacts glow;

means for detecting the length of the glow zone created in said station;

means connected to the detecting means for automatically varying said spacing by displacing one of said contacts relative to the other contact to maintain said glow zone of constant length; and means for cooling said tube downstream of said soldering station.

5. The method defined in claim 3 wherein said spacing is varied automatically.

6. The apparatus defined in claim 4 wherein said other contact is fixed.

7. The apparatus defined in claim 6 wherein said contact at said station is fixed.

8. The apparatus defined in claim 7 wherein said one contact is upstream of said station.

9. The apparatus defined in claim 8 wherein said apparatus has a housing enclosing said tube at said station, said one contact being outside said housing.

* * * * *